Aug. 30, 1960 W. E. BORDEN 2,950,645
REMOTE CONTROL APPARATUS FOR MOTION PICTURE CAMERA
Filed March 10, 1958 3 Sheets-Sheet 2

INVENTOR.
WESLEY E. BORDEN
BY
Price and Henseveld
ATTORNEYS

INVENTOR.
WESLEY E. BORDEN
BY
Price and Heneveld
ATTORNEYS

United States Patent Office 2,950,645
Patented Aug. 30, 1960

2,950,645

REMOTE CONTROL APPARATUS FOR MOTION PICTURE CAMERA

Wesley E. Borden, 1349 Alpine NW., Grand Rapids, Mich.

Filed Mar. 10, 1958, Ser. No. 720,103

6 Claims. (Cl. 88—16)

This invention relates to motion picture cameras in general, and more particularly to a remote control device for use with such cameras.

There are numerous different occasions when it is desirable to be able to operate a camera from a remote location. This is true with both still and moving picture cameras. Remote control operation is particularly desirable for moving picture cameras for nature studies, cartooning, pictorial advertising sequences, etc. The more expensive moving picture cameras usually include a selective control for single frame or continuous frame operation. With such cameras numerous sequences of film may be taken from a remote location without disturbing the camera or being in the immediate vicinity of the camera.

Previous mechanisms for remote control camera operation have been of either an over simplified mechanical nature or of a more complicated electrical nature. The simple mechanical device may include such as a Bowden wire connection to the primary camera control. This type of remote control apparatus is severely limited as to the distance from which it can be operated and is usually rather awkward to operate. The electrical control apparatus for remote control camera operation usually requires the use of storage batteries and other equipment which is both expensive and cumbersome to carry about.

This invention teaches a new and improved means for operating a camera from a remote location. Such means includes the simplicity of operation of the electrical control means previously proposed without the incident expensive apparatus or use of cumbersome storage batteries and other equipment which is awkward to carry around. At the same time the apparatus proposed has the relative simplicity of mechanical control apparatus but with a far greater range of distance from which it may be effectively operated.

It is an object of this invention to make use of a pneumatic camera actuating device for selectively controlling the camera from a remote location. Such a pneumatic system as is hereinafter disclosed has been found highly successful at distances of five hundred feet from the camera location.

It is also an object of this invention to make use of a simple pneumatic control apparatus for cameras. The particular pneumatic system disclosed includes a compressible air bulb which can be squeezed in one's hand at a remote distance from the camera. The air bulb is connected to the camera by a flexible air line and delivers an air charge to certain responsive mechanism connected to the camera.

Another object of this invention is to make use of a simple pneumatic control system for operating a camera control between different control positions. Moving picture cameras may include a control for single frame operation, continuous frame operation, and continuous frame locking operation. It is a purpose of this invention to retain and have available each of these camera control settings with the proposed remote control apparatus.

The particular embodiment of this invention which is disclosed makes use of an air pressure responsive diaphragm member for operating a piston or plunger member. The plunger member is in turn operatively engaged with rack surfaced members disposed for cooperative engagement with a gear member. The gear member is adapted to position the camera control in accord with the rotational movement imparted to it by the rack surfaced members. This will be more fully described later in the specification.

In view of the intercooperative engagement of certain gear toothed members, the closed condition of this apparatus, and the remote location from which the camera is to be operated, it is important that the remote control settings for the remote control apparatus be safeguarded against an inadvertent locking or jamming. This is accomplished by the use of an interlock between the remote control selector control and one of the gear toothed members to prevent actuation of the one without having the other first properly positioned.

Still another feature of the remote control apparatus hereinafter disclosed is the use of a prepositioned limit stop to prevent a locked continuous frame operation by the remote control mechanism unless desired.

These and other advantages obtainable in the practice of this invention will be more apparent upon a reading and study of the apparatus hereinafter disclosed.

Figure 1:
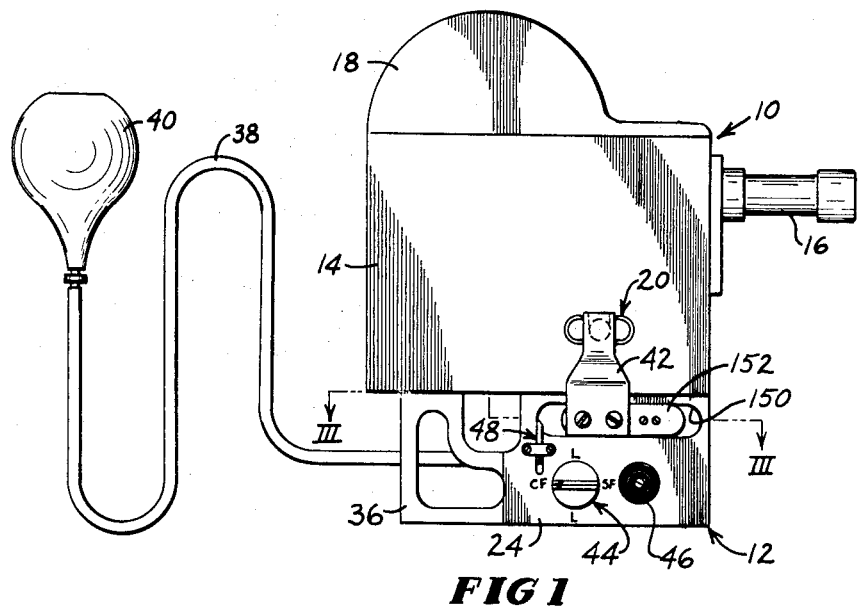
Fig. 1 is a side elevational view of a camera equipped with the remote control apparatus of this invention.
Figure 2:
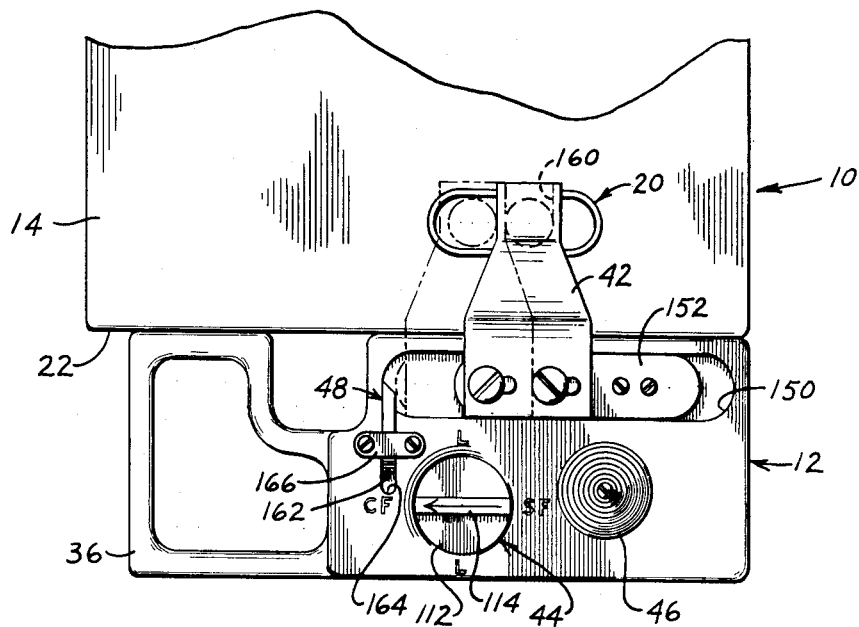
Fig. 2 is an enlarged side elevational view of the remote control apparatus.

Referring to the drawings in further detail Fig. 1 shows a movie camera 10 having the disclosed remote control apparatus 12 attached thereto. The movie camera includes a camera box 14 having the lens or eye piece 16 extending from its front face. A movie film magazine 18 forms part of the top of the camera box. A film frame selective control 20 is exposed on one side of the camera box. The remote control apparatus 12 is secured to the base 22 of the camera.

Figures 7, 8:
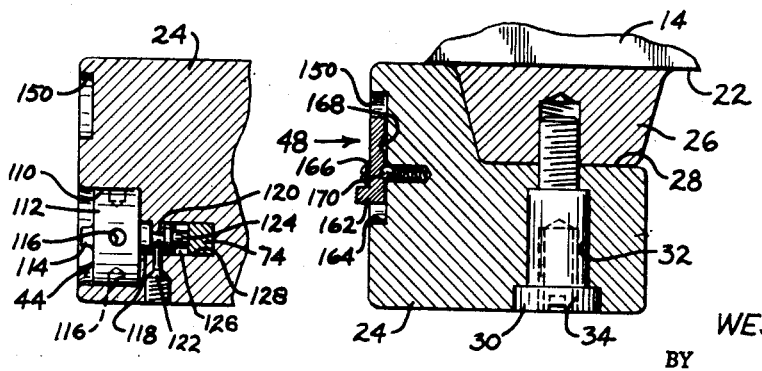
Fig. 7 is a cross sectional view through a part of the remote control apparatus to show the selector control of such apparatus.
Fig. 8 is a cross sectional view through a part of the remote control apparatus as shown by Fig. 3, in the plane of line VIII—VIII and looking in the direction of the arrows thereon.

The remote control apparatus 12 includes a housing 24 for the remote control mechanism. The housing 24 is secured to the base 22 of the camera as is shown by Fig. 8. The camera base includes a boss 26 which is normally used for a tripod attachment. The housing member 24 is formed to include a boss receiving shoulder 28. A threaded bolt fastener 30 is extended through a bolt access 32 in the housing member and is received in threaded engagement with the tripod boss. The bolt fastener 30 is itself formed to include a threaded access 34 for tripod attachment to the base of the remote control housing.

The housing member 24 of the remote control apparatus 12 has a handle 36 provided on the back of the housing member. A flexible air line 38 is connected to the one side of the housing 24 and has a compressible air bulb 40 provided at the other end thereof. The air line 38 is of such suitable length as will dispose the air bulb 40 at a remote location from the movie camera 10. The air bulb 40 is such as may be readily compressed or squeezed within an operator's hand to send an air charge through the air line 38 to the remote control apparatus.

The housing member 24 for the remote control apparatus 12 also includes an operative control arm 42 which is engaged with the frame selective control 20 of the movie camera 10. A selective operational control 44 is provided on the face of the housing member 24. The settings for the control 44 correspond to those manually obtainable by operation of the frame selective control 20 of the movie camera 10. A control release button 46 and a control limit stop 48 are also exposed on the face of the housing member 24.

The internal mechanism within the housing 24 of the remote control apparatus 12 is as follows: A chamber 50 is provided within one side of the housing 24. The chamber 50 is closed by a closure plate 52. The air line 38 is in communication with the chamber 50 by means of an air hose coupling 54 provided in the side of the housing member 24, and interconnecting passages 56 and 58 opening into a chamber recess 60 provided in the interface of the closure plate 52. A flexible diaphragm member 62 is disposed across the outer end of the chamber 50. The diaphragm 62 is held in place by the engagement of the closure plate 52 within the side wall of the housing member 24. A reciprocal piston of plunger 64 is disposed within the chamber 50. The head 66 of the plunger member is disposed next adjacent the diaphragm 62. The plunger shank 68 is guided for reciprocal movement through the inner end wall 69 of the chamber 50.

Figure 6:
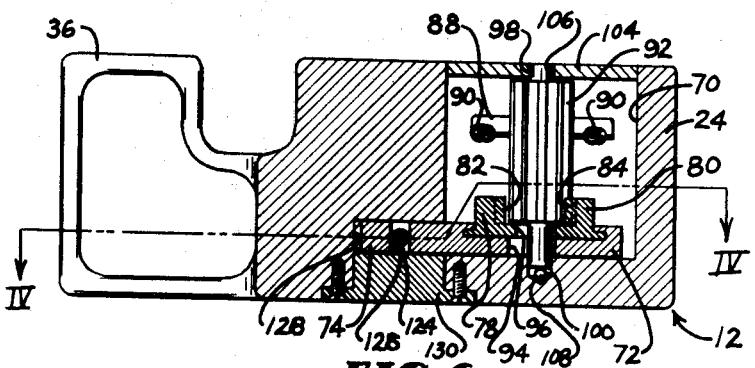
Fig. 6 is a cross sectional side view of the remote control apparatus taken in the plane of line VI—VI of Fig. 3 and looking in the direction of the arrows thereon.

A second chamber space 70 is provided internally of the housing member 24. Within the chamber space 70 is provided a slide plate 72 having a guide arm 74, as best seen in Fig. 6. The guide arm 74 is operatively connected to the selective control 44 of the remote control apparatus as will later be described.

A second slide member 76 is guided within slide plate 72 for cross movement normal to that permitted the guided slide plate 72. The second slide member 76 is formed to include parallel spaced lands 78 and 80. The adjacently disposed sides of the lands 78 and 80 are formed to include rack surfaces 82 and 84 respectively. The end of the slide member 76 has an upright member 86 disposed for engagement by the plunger shank 68 extending through the chamber dividing wall 69. A bracket 88 is provided on the chamber end wall 69 and includes tension springs 90 which are engaged to posts 87 and 89 on the other end of the slide member 76 to hold it in biased engagement with the end 68 of the plunger member 64. The tension springs 90 thus serve to hold the rack surfaced slide member 76 in a normally retracted position.

A pinion gear member 92 is rotatably mounted between the racks 82 and 84 of the slide member 76. Both of the slide plates 72 and 76 include cutout accesses 94 and 96 respectively for receiving the pinion gear shaft 98 therethrough. A shallow blind end shaft bore 100 is provided in the base of the chamber 70 upon which the slide plate member 72 is operable. The cover plate member 104 which closes the chamber space 70, includes an aligned shaft bore 106. A ball bearing member 108 is disposed in the blind end shaft bore 100 to properly position the end of the pinion gear in spaced relation to the surface of the second slide plate member 76 and for proper mating engagement with the rack surfaces 82 and 84 without interference with the slide movement of the slide plate members 72 and 76.

The selector control 44 of the remote control apparatus 12 is disposed within a recess 110 provided in the face of the housing member. The selector control 44 includes a drum head 112 having a pointer 114 formed on its outer face. Control position indicating indicia is provided on the face of the housing member 24 about the control recess 110. The initials "SF" indicate single frame operation. The initials "CF" indicate continuous frame operation. The initial "L" indicates a locked position. The drum head 112 includes detent accesses 116 spaced ninety degrees apart on the outer periphery thereof. The drum shaft 118 includes a necked portion 120 for receiving a locator screw 122 threaded through the base of the housing member. This is best shown by Fig. 7. The end of the drum shaft 118 includes an eccentric finger 124. The eccentric finger 124 is received within a cutout slot 126 provided in the guide arm 74 of the slide plate 72. The lower surface of the guide arm receiving access 128 is closed by an inspection plate and support block member 130 secured in the base of the housing member. Member 130 may be removed to inspect the eccentric finger location within the guide arm slot, for lubrication purposes, and to be assured that the guide arm 74 will not bind within its receiving access 128.

Rotation of the selector control 44 causes lateral movement of the slide plate 72 and of the racks 82 and 84 relative to the pinion gear member 92. The slide member 76, which includes the rack surfaces 82 and 84, is also capable of cross movement by means of the air pressure responsive plunger 64. If the selector control 44 is rotated at a time when the rack surfaces 82 and 84 are not properly positioned for interchanging engagement with the pinion gear 92 there is a chance that the operating mechanism may jam. A selective interlock 132 is provided to avoid this possibility.

Figure 4:
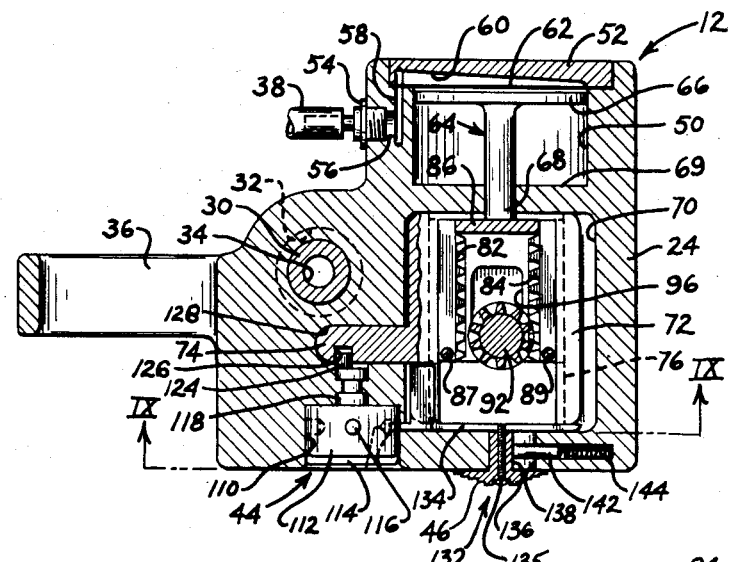
Fig. 4 is a top cross sectional view through another part of the remote control apparatus as seen in the plane of line IV—IV of Fig. 6, looking in the direction of the arrows thereon.
Figure 9:
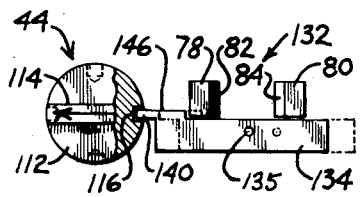
Fig. 9 is a cross sectional view of an interlock feature of the disclosed apparatus as seen in the plane of line IX—IX of Fig. 4 and looking in the direction of the arrows thereon.

The interlock 132 includes a reciprocal arm 134 within the chamber 70 and which is operated by the control button 46 exposed on the face of the housing 24. As shown by Fig. 4, the shank 136 of the control button 46 is engaged to the guided arm 134 by a crew 135. The button shank 136 is received within an elongated slot 138 formed through the housing side wall. The end of the guided arm 134 includes a finger 140 which is engageable within the detent accesses 116 in the drum head 112 of the selector control 44, as shown by Fig. 9. The guided arm 134 is biased towards the selector control 44 by a detent member 142 within the elongated slot 138 and which is backed by a compression spring 144. The interlock also includes a right angle tab 146 which is disposed for selective engagement with the land 78 of the slide member 76. The right angle tab 146 is disposed free from engagement with the land 78 when the detent finger 140 of the guide arm is received in one of the detent accesses 116 of the selector control drum head 112. When the interlocked control button 46 is actuated to release the selective control 44, the tab moves into a position for engagement with the land 78 of the slide plate member 76. Consequently, the slide plate member 76 must be in a fully retracted position against the chamber end walls 69 before the interlock 132 can be actuated and until the interlock is actuated the selector control 44 cannot be rotated.

Figure 3:
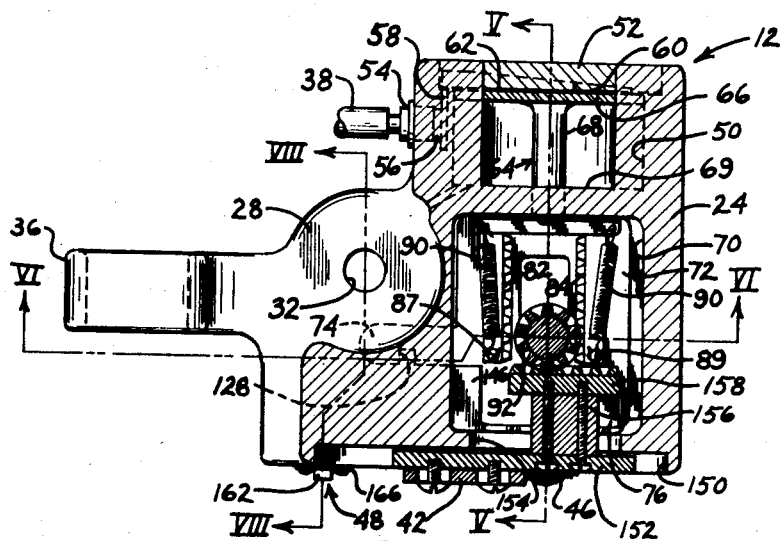
Fig. 3 is a top cross sectional view through part of the remote control apparatus as seen in the plane of line III—III of Fig. 1, looking in the direction of the arrows thereon.
Figure 5:
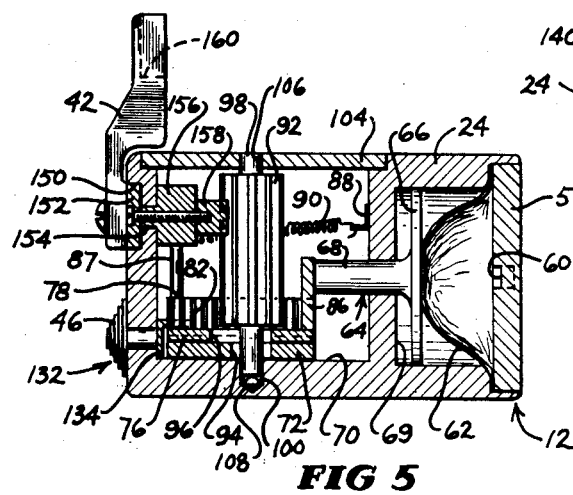
Fig. 5 is a cross sectional end view of the remote control apparatus taken in the plane of line V—V of Fig. 3 and looking in the direction of the arrows thereon.

The mechanism thus far disclosed shows how the pinion gear 92 may be rotated either clockwise or counterclockwise depending upon which rack 82 or 84 it is engaged with when the plunger member 66 is actuated to cause movement of the interconnected racks with the slide plate 76. The means which is operatively connected between the pinion gear 92 and the camera frame selective control 20 is as follows:

An elongated recess 150 is provided in the side face of the housing member 24. An elongated guide following member 152 is disposed within the recess 150. A guide slot 154 is formed through the housing side wall from within the guide recess 150. A shouldered internal slide member 156 is connected to the external guide member 152, as best shown in Figs. 3 and 5. A rack member 158 is secured to the internal shouldered slide member 156 and is disposed for mating engagement with the pinion gear 92.

The camera control engaging arm 42 is secured to the guide follower 152 and is extended and formed for engagement with the frame selective control 20 of the movie camera 10. The camera control engaging end of arm 42 is formed to include a recess 160 within which the button of the frame selective control 20 is readily received.

The mechanism thus far described discloses means for moving the frame selective control 20 of the movie camera 10 in a forward or reverse direction from its normally centered neutral position. Most cameras having a single frame and continuous frame selective control have an automatic return built into the camera control switch. They also generally include a locking over position for continuous frame operation.

The disclosed remote control apparatus also includes a limit stop device 48 which is operable to exclude the locking over position for continuous frame operation, for situations in which it is desirable to take different short sequences of continuous frame operation from a remote location without running the whole reel of film.

The limit stop 48 is shown by Figs. 3 and 8 to include a small finger operated slide member 162 received within a guiding recess 164 formed in the side face of the housing member 24 near the end of the control arm recess 150. The finger slide 162 is retained within the guide recess 164 by a small strap 166 secured across the guide recess. The inner side of the finger slide 162 includes detent recesses 168. A spring loaded ball detent 170 is received within the recesses 168 to hold the finger slide 162 in its selected position. The upper end of the finger slide 162, in the upper position of the finger slide, is disposed within the end of the control arm guiding recess 150. This prevents the arm controlling guide following member 152 from reaching an extreme end position. Consequently, the control arm 42 cannot be actuated to its far end position which is the locking over position for the frame selective control 20.

Figure 10:
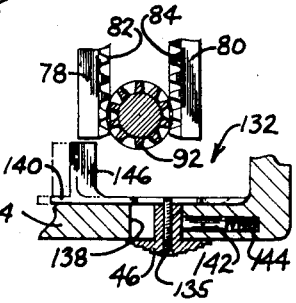
Fig. 10 is a partial top view of the disclosed apparatus showing the interengaging gear toothed parts in an interlocked relation.

The spacing between the rack surfaces 82 and 84 is such that the movement of the slide plate 72, by the eccentrtic selector control finger 124, will operatively engage one or the other of the rack surfaces 82 and 84 with the pinion gear, in accordance with their selection. Furthermore, the spacing of the rack surfaces 82 and 84 is such that the pinion gear 92 may be engaged with both racks simultaneously, as shown by Fig. 10. This is intended to occur when the selective control 44 is positioned in the "lock" position. In such instance the eccentric control finger 124 disposes the slide plate 72 between the end positions of movement permitted the slide plate and the pinion gear 92 is engaged with both racks 82 and 84 so that the remote control apparatus is temporarily inoperative.

Operation

A movie camera 10 having the remote control apparatus 12 of this invention would be operated in the following manner:

The remote control apparatus 12 is secured to the base of the camera 10 by means of the tripod boss 26. In so doing, the frame selective control 20 of the movie camera is engaged within the control arm recess 160 of the connecting and operating arm 42 of the remote control apparatus. The air line 38, with the squeeze bulb 40 at its other end, is secured to the air hose coupling 54 at the side of the remote control housing 24.

The movie camera 10 is mounted, aimed, focused, and otherwise set for taking pictures at a particular location. The air line 38 is run out to the remote location from which the camera is to be operated. Since the remote control apparatus 12 is normally in a locked position when disassociated from a camera, there need be no concern about the squeeze bulb 40 being accidently compressed and inadvertently causing the camera to operate. The locked position of the remote control apparatus disposes the rack members 82 and 84 both in engagement with the pinion gear 92, as previously described, and assures that the remote control apparatus is inoperative for the moment.

The camera operator next decides whether he wishes to have the camera operate on single frame, continuous frame, or continuous frame locked position. If the overlocking continuous frame position is not desired, the limit stop finger 162 is raised to extend within the end of the guide recess 150 to prevent the control arm 42 from actuating the frame selective control 20 of the camera to the overlocking continuous frame position.

If the continuous frame or single frame camera operation is desired the selector control 44 of the remote control apparatus is to be turned to so indicate. This first requires that the control button 46 of the selective interlock 132 be actuated to release the drum head 112 of the remote control selector 44. Upon actuating the interlock control 132 the tab 146 of the interlock arm 134 will indicate the fully retracted position of the rack surfaced slide member 76, as previously mentioned. Once the interlock finger 140 is withdrawn from the detent access 116 in the selector control drum head 112, the selector control 44 may be rotated to the desired position Rotation of the selective control 44 is translated to linear movement of the slide plate 72 by means of the eccentric finger 124 in the guide arm slot 126 of the slide plate. The slide plate will be moved to one of its extreme end positions in which one of the rack surfaces 82 or 84 will be in mating engagement with the pinion gear 92. The interlock finger 140 is engaged within another one of the drum head detent accesses 116 as soon as the selective control 44 is properly positioned.

The movie camera 10 is now ready to be operated from the remote control position. When the squeeze bulb 40 is compressed a charge of air passes through the air line 38 to within the chamber recess 60 of the closure plate plate 52. The air charge expands the diaphragm member 62, as shown in Fig. 5. The diaphragm moves the piston or plunger member 64 across chamber 50. The plunger shank 68 actuates the cross slide 76 and the linear travel thereof moves the selected rack 82 or 84 tangentially of the pinion gear 92. This causes rotation of the pinion gear 92 and linear movement of the rack member 158. The linear movement of the rack member 158 causes the guide follower member 152 to move the control arm 42 and actuate the frame selective control 20 of the camera in the desired direction.

The automatic return mechanism of the frame selective control 20 in the camera, as well as the biasing of the cross slide 76 by the tension springs 90, assist in returning the camera mechanism to a neutral position when the air bulb 40 is released.

The remote control apparatus which has been described is principally mechanical in nature. However, the pneumatic operating means provided enable operating the camera from a farther and more remote location. The remote control apparatus operates the camera at any selected camera operating speed. No electrical apparatus is used. Thus the necessity for carrying heavy storage batteries or the like is avoided.

While a preferred embodiment of this invention has been described it will be understood that other modifications and changes may be made within the scope of the invention as defined in the appended claims.

I claim:

1. A remote control device for movie camera having a manually operated multi-position camera control exposed thereon, said remote control device comprising; an air pressure responsive plunger member, a pair of interconnected parallel spaced rack toothed members operatively engaged to said plunger, a pinion gear rotatably mounted between said rack members, means operatively engaged with said rack members for selectively positioning said rack members for the engagement of one thereof with said pinion gear, and means interconnected between said pinion gear and said multi-position camera control for operatively positioning said control in a direction responsive to the rotational direction of said pinion gear.

2. A remote control device for movie cameras having a manually operated multi-position camera control exposed thereon, said remote control device comprising; an air pressure responsive plunger member, a pair of interconnected parallel spaced rack toothed members operatively engaged to said plunger, a pinion gear engaged with said rack members for selectively positioning said rack members for the engagement of one thereof with said pinion gear, and another rack toothed member engaged with said pinion gear and operatively engaged to said multi-position camera control for the positioning thereof in response to the rotational direction of said pinion gear.

3. A remote control device for movie camera having a manually operated multi-position camera control exposed thereon, said remote control device comprising; a housing member for attachment to said movie camera, a plunger member mounted within said housing, an air bulb operated diaphragm member mounted within said housing and operatively engaged with said plunger, a pair of parallel spaced and interconnected rack surfaced members slidably mounted within said housing and biased for engagement with said plunger member, a pinion gear rotatably mounted within said housing between said rack surfaced members, means for laterally adjusting said interconnected rack surfaced members for the selective engagement thereof with said pinion gear, and a laterally adjustable rack surfaced member operatively engaged with said pinion gear and said multi-position camera control for actuating said control in accord with the rotational movement imparted to said pinion gear as engaged with one of said interconnected rack surfaced members.

4. A remote control device for movie cameras having a manually operated multi-position camera control exposed thereon, said camera control being slidably operable from a neutral position towards forward and reverse camera actuating positions including one of which is a locking nonreturn position, said remote control device comprising; air pressure responsive means operatively engaged to said camera control for actuating said control towards one of said camera actuating positions, preselective means operatively interconnected between said air pressure responsive means and said camera control for predesignating one of said camera actuating positions, and a limit stop operatively disposed for selective engagement with said camera control to prevent said control from being fully actuated into said locking nonreturn position.

5. A remote control device for movie camera having a manually operated multi-position camera control exposed thereon, said remote control device comprising; a remote control housing having an air bulb pressure responsive plunger member reciprocally mounted therein, a pair of interconnected rack surfaced members slidably mounted within said housing and biased for engagement with said plunger, a pinion gear rotatably mounted within said housing and disposed for selective engagement with either and both of said rack surfaced members, locator means for engaging and locating said interconnected rack surface members during the interchanging engagement of said pinion gear between said rack surfaced members to prevent jamming, and means operatively connected to said pinion gear and said camera control for positioning said control in response to the rotational movement of said pinion gear as engaged with one of said rack surfaced members.

6. A remote control device for movie camera having a frame selective control exposed thereon and wherein said camera control is reciprocal from a neutral position to forward and reverse frame selective positions, one of said positions including a locking over position, said remote control device comprising; a remote control housing attachable to said movie camera, a reciprocal plunger mounted within said housing, an air bulb operated diaphragm engaged with one end of said plunger, a pair of parallel spaced and interconnected rack surfaced members slidably mounted within said housing and biased in engagement with the other end of said plunger, a pinion gear rotatably mounted within said housing and disposed for selective engagement with either and both of said rack surfaced members, laterally adjustable means engaged with said interconnected rack surfaced members for selectively engaging either or both of said rack surfaced members with said pinion gear, means operatively engaged between said pinion gear and said camera control for the adjustment of said camera control in response to the rotational movement of said pinion gear imparted thereto by one of said rack surfaced members, locator means operatively mounted within said housing for selectively engaging and locating said interconnected rack surfaced member precedent to the interchange of engagement with said pinion gear therebetween and for preventing jamming, and a selectively operable limit stop mounted on said housing for engaging and limiting the movement of said camera control into said locking over position.

References Cited in the file of this patent

UNITED STATES PATENTS

| | | |
|---|---|---|
| 971,873 | Young | Oct. 4, 1910 |
| 1,344,997 | Emmrick | June 29, 1920 |
| 1,460,785 | Buckley | July 3, 1923 |
| 2,650,501 | Murray | Sept. 1, 1953 |